United States Patent Office 3,216,884
Patented Nov. 9, 1965

3,216,884
POLYESTER/PHENOL-ALDEHYDE RESIN EMULSION MOLDING COMPOSITION AND LAMINATED ARTICLES
Lawrence Emmett O'Donnell, Tonawanda, N.Y., assignor to Hooker Chemical Corporation, Niagara Falls, N.Y., a corporation of New York
No Drawing. Filed May 14, 1962, Ser. No. 194,682
21 Claims. (Cl. 161—232)

This invention relates to the treatment of cellulosic materials with polymeric materials. In a more specific aspect, it relates to the treatment of cellulosic materials such as paper with both phenolic resins and polyester resins. The invention also relates to novel polymer-containing compositions for use in such treatment processes, and to the products resulting from the improved processes.

It has been known to impregnate paper with phenolic resins and to utilize the treated paper in molding laminates that have good moisture resistance and good electrical properties such as dielectric constant, dissipation factor, and insulation resistance. Such laminates have been used in producing electrical board for use in printed circuits. The properties of such treated cellulosic products can be improved by also treating them with a polyester resin. But since a phenolic resin is generally water soluble, and polyesters are not water soluble, it would be expected that a two-step operation would be involved in treating cellulosic materials with both a phenolic resin and a polyester resin, and such a process would be uneconomical in industry.

Accordingly, it is an object of the invention to provide a novel method for treating cellulosic materials with dissimilar polymeric materials. It is another object of the invention to provide a novel method for treating cellulosic materials with both a phenolic resin and a polyester resin. Another object of the invention is to provide a composition for use in treating cellulosic materials that will impart superior electrical properties to laminates molded therefrom. A further object of the invention is to provide a novel method for molding superior laminates for use in electrical applications. It is still another object of the invention to provide treated paper for making laminates with superior electrical properties and "punching" properties. It is still a further object of this invention to provide superior laminated articles having low dielectric constant, excellent insulation resistance, and good punching properties for use in producing electrical board such as required in printed circuits. These and other objects will become evident from a consideration of the following detailed specification.

In accordance with the invention, there is provided a process which comprises contacting a cellulosic material with an emulsion comprising droplets of a solution of a phenol-aldehyde resin dissolved in a suitable diluent suspended in an unsaturated polyester resin. The resulting treated cellulosic material is freed of diluent, the resins therein are partially cured, and the product is suitable for use in molding laminates by conventional techniques.

In accordance with another aspect of the invention, there is provided a novel composition comprising an emulsion which consists of an unsaturated polyester resin as the continuous phase and a solution of a phenol-aldehyde resin in a suitable diluent as the dispersed phase, said composition finding utility in the treatment of cellulosic materials to improve the properties thereof.

In accordance with still another aspect of the invention, there are provided novel treated cellulosic materials and laminated products molded therefrom, said materials and products having been produced using the novel methods and emulsion compositions provided by the invention.

The cellulosic materials useful in the invention are any of those derived from natural sources such as from wood, cotton and the like; as well as chemically treated varieties such as regenerated cellulose commonly known as rayon. It is generally preferred that the cellulosic material be consolidated in the form of a self-supporting sheet such as paper, or a woven or non-woven fabric. Paper is the preferred cellulosic material of the invention, and all types of paper, made by any of the well-known paper production processes, are contemplated.

The unsaturated polyesters useful in the invention are generally those commonly known in the art, and are generally the reaction product of a polycarboxylic compound and a polyhydric alcohol. By polycarboxylic compounds is meant the polycarboxylic acids, polycarboxylic anhydrides, polycarboxylic acid halides, and polycarboxylic acid esters. The unsaturation can be provided in either or both the polycarboxylic compound or the polyhydric alcohol. Suitable unsaturated polycarboxylic acids having alpihatic carbon-to-carbon double bonds, and the corresponding acid halides, esters, and anhydrides can include maleic, chloromaleic, ethylmaleic, itaconic, citraconic, zeronic, pyrococinchoninic and acetylene dicarboxylic, either alone or in mixtures.

Illustrative of the unsaturated polyhydric alcohols having aliphatic carbon-to-carbon double bonds, which can be used in providing the unsaturation in the linear polyester molecules are compounds such as butene diol, pentene diol, the unsaturated hydroxy ethers such as allyl or vinyl glycerol ethers, allyl or vinyl pentaerythritol ethers and the like.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, adipic, succinic, and mixtures thereof.

Suitable saturated polyhydric alcohols for use in the preparation of the polyester resins include ethylene glycol, diethylene glycol, propylene glycol, dipropylene glycol, butane diol, pentane diol, hexane diol, glycerol, mannitol, sorbitol, bisphenols, substituted bisphenols, hydrogenated bisphenols and mixtures thereof.

The properties of the polyesters can be varied by using mixtures of the various types of acids and alcohols, such as an unsaturated acid, a saturated acid and a saturated alcohol.

Often, it is desired to employ fire-resistant, unsaturated polyesters in the invention. This requirement is met by unsaturated polyesters that contain either an adduct of hexahalocyclopentadiene and a polycarboxylic compound containing aliphatic carbon-to-carbon unsaturation or an adduct of hexahalocyclopentadiene and a polyhydric alcohol containing aliphatic carbon-to-carbon unsaturation. The preferred unsaturated polyesters are the reaction products of a polycarboxylic adduct of hexahalocyclopentadiene, another carboxylic compound containing carbon-to-carbon unsaturation and a polyhydric alcohol. Such a product is disclosed and claimed in U.S. Patent 2,779,-701, issued January 29, 1957. Other methods for incorporating either a polycarboxylic or polyhydric alcohol adduct of hexahalocyclopentadiene include: (1) the reaction of a polycarboxylic adduct of hexahalocyclopentadiene, an unsaturated polyhydric alcohol containing aliphatic carbon-to-carbon unsaturation, disclosed and claimed in U.S. Patent 2,863,794, issued December 9, 1958; (2) the reaction of a polyhydric alcohol adduct of hexahalocyclopentadiene with a polycarboxylic compound containing aliphatic carbon-to-carbon unsaturation. disclosed and claimed in U.S. Patent 2,779,700, issued January 29, 1957; and (3) the reaction of a polyhydric alcohol adduct of hexahalocyclopentadiene with another alcohol containing aliphatic carbon-to-carbon unsaturation and a polycarboxylic acid, disclosed and claimed in U.S. Patent 2,863,795, issued December 9, 1958. An alternate method for incorporating an adduct of hexahalocyclopentadiene into a polyester resin involves reacting an unsaturated polyester resin with a copolymerizable compound containing an adduct of hexahalocyclopentadiene, such as disclosed and claimed in U.S. Patent 2,783,215, issued February 26, 1957. The polyester resins containing the polycarboxylic and polyhydric alcohol adducts of hexahalocyclopentadiene can be modified by incorporating therein saturated carboxylic acids and anhydrides, as disclosed and claimed in U.S. Patent 2,890,144, issued June 9, 1959, and U.S. Patent 2,898,256, issued August 4, 1959. When used in this specification, the term polycarboxylic compound refers to the polycarboxylic acids, acid anhydrides, acid halides and acid esters, of either the aliphatic or aromatic type.

Among the adducts of hexahalocyclopentadiene and polycarboxylic compounds which may be used are: 1,4,5,6,7,7 - hexachlorobicyclo-(2.2.1)-5-heptene-2,3-dicarboxylic acid; 1,4,5,6,7,7-hexachlorobicyclo-(2.2.1)-5-heptene-2,3-dicarboxylic anhydride; 1,4,5,6,7,7-hexachloro-2-methylbicyclo - (2.2.1)-5-heptene-2,3-dicarboxylic anhydride; the mono- or di-methyl ester of 1,4,5,6,7,7-hexachlorobicyclo - (2.2.1)-5-heptene-2,3-dicarboxylic acid; 1,4,5,6-tetrachloro - 7,7-difluorobicyclo-(2.2.1)-5-heptene-2,3-dicarboxylic acid; 1,4,5,6,7,7 - hexachlorobicyclo-(2.2.1)-5-heptene-2-acetic-2-carboxylic anhydride; and 1,4,5,6,7,7-hexachlorobicyclo-(2.2.1)-5-heptene-2,3-dicarbonyl chloride which is the adduct of hexachlorocyclopentadiene with fumaryl chloride.

Among the adducts of hexahalocyclopentadiene and polyhydric alcohols which may be used are: 1,4,5,6,7,7-hexachloro - 2,3-bis-hydroxymethylbicyclo-(2.2.1)-5-heptene; 1,4,5,6,7,7-hexachloro-2,3-bis-hydroxymethylbicyclo-(2.2.1)-2,5-heptadiene; 3-(1,4,5,6,7,7-hexachlorobicyclo-(2.2.1) - 5 - heptene-2-yl)-methoxy-1,2-propanediol; 1,4,5,6 - tetrachloro - 7,7-difluoro-2,3-bis-hydroxymethylbicyclo - (2.2.1)-5-heptene; 1,4,5,6,7,7-hexabromo-2,3-bis-hydroxy - methylbicyclo-(2.2.1)-5-heptene; 3-(1,4,5,6-tetrachloro - 7,7-difluorobicyclo-(2.2.1)-5-heptene-2-yl)-methoxy-1,2-propane diol. These compounds and methods of preparation are disclosed in U.S. Patent No. 3,007,958, issued November 7, 1961.

It is also within the scope of the invention to use other halogen-containing polyesters such as those derived from tetrachlorophthalic acid anhydride. The polycarboxylic compounds and polyhydric alcohols required in the production of the foregoing halogen-containing adducts and polyesters can be provided by using any of the compounds disclosed hereinbefore.

The temperature for the reaction between polyhydric alcohols and polybasic acids ranges from about one hundred to two hundred degrees centigrade, although higher or lower temperatures can be used. Esterification catalysts such as para-toluene sulfonic acid, benzene sulfonic acid, beta-naphthalene sulfonic acid and the like, or amines such as pyridine, triethyl amine, quinoline and the like can be added to the reaction mixture. The proportion of polyhydric alcohol is approximately controlled by the total mol proportion of acids in the esterification reaction mixture. It is also preferred to react the polyhydric alcohols and polybasic acids in roughly equimolar proportion, however, either the acids or alcohols can be used in substantial excess, if it is desired to form a low molecular weight polyester resin.

A variety of ethylenically unsaturated monomers can be used for curing or cross-linking the ethylenically unsaturated polyesters. It is generally preferred that addition polymerization be practiced since no by-product ammonia or water is formed, and the problems resulting therefrom are not experienced. The vinylidene monomers useful in curing the thermoplastic unsaturated polymers include vinylic compounds or mixtures thereof capable of cross-linking ethylenically unsaturated polymer chains at their points of unsaturation. Usually they contain the reactive groups $H_2C=C<$. Specific examples include include styrene, chlorostyrenes, methyl styrenes such as alpha methyl styrene, p-methyl styrene, divinyl benzene, indene, unsaturated esters such as: methyl methacrylate, methyl acrylate, allyl acetate, diallyl phthalate, diallyl succinate, diallyl adipate, diallyl sebacate, diethylene glycol bis(allyl carbonate), triallyl phosphate and other allyl esters, and vinyl toluene, diallyl chlorendate, diallyl tetrachlorophthalate, the lower aliphatic esters other than methyl of methacrylic and acrylic acids, ethylene glycol diacrylate, dimethacrylate, diethacrylate, etc. The monomer may be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

As disclosed hereinbefore, the adduct of hexahalocyclopentadiene can be added in the cross-linking agent. Among such cross-linking agents which can be used for this purpose are the following: diallyl-1,4,5,6,7,7-hexachlobicyclo - (2.2.1)-5-heptene-2,3-dicarboxylate; diallyl-1,4,5,6,7,7 - hexachloro - 2-methylbicyclo-(2.2.1)-5-heptene-2,3-dicarboxylate; diallyl-1,2,4,5,6,7,7-heptachlorobicyclo-(2.2.1)-5-heptene-2,3-dicarboxylate; and triallyl-1,4,5,6,7,7 - hexachlorobicyclo-(2.2.1)-5-heptene-2-acetate-2,3-dicarboxylate. These compounds can be prepared by reacting hexachlorocyclopentadiene with the indicated dicarboxylic acid and esterifying the resultant product with an unsaturated alcohol such as allyl alcohol. Other cross-linking agents may advantageously be employed; for example reaction products of hexachlorocyclopentadiene with isoprene or butadiene retaining a reactive unsaturated linkage can be used as cross-linking agents directly without further reaction.

The proportion of olefinic cross-linking agent to unsaturated polyester can be varied within the ultimate limits each without departing from the scope of the invention, necessary to produce an infusible, insoluble, polyester resin. In general, the concentration of the unsaturated polyester in the olefinic cross-linking agent can vary between about ten and ninety percent. Polymerization catalysts are preferably added to the mixture of unsaturated polyester and olefinic cross-linking agent to effect setting or curing. Catalysts such as benzoyl peroxide, acetyl peroxide, lauryl peroxide, methylethyl ketone peroxide, cumene hydroperoxide and the like are satisfactory. Such catalysts are used in proportions of 0.01 to ten percent of the total resin, depending on the efficiency of their action and whether or not substances which inhibit polymerization are present in the mixture. The polymerization reaction can also be hastened by adding promoters such as metals or metal salts, cobalt resinates, cobalt maleate, cobalt naphthenate and the like, or amines such as dibutylamine, or mercaptans such as dodecyl mercaptan. These are used in proportions similar or smaller to that stated for the catalysts.

Fusible, water soluble condensation products of a phenol and an aldehyde suitable for use as starting materials in practicing this invention are well known in the art and can be prepared by well known methods. The phenol-aldehyde condensate may also be soluble in organic solvents such as acetone, and should not be advanced to the insoluble "C" stage or resite stage. When the phenol is phenol itself and the aldehyde if formaldehyde, one type of condensate which is highly satisfactory contains condensation units which may be exemplified by the following formula:

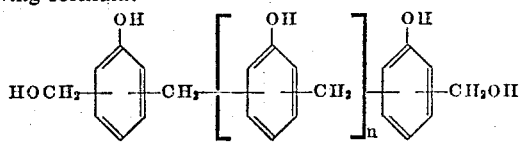

where $n$ represents a numeral varying from about 1 to 10, and often higher provided the resin is fusible and acetone or organic solvent-soluble. Preferably, the phenol-aldehyde condensate contains more than one mole of aldehyde per mole of phenol.

Examples of phenols which may be used in preparing phenol-aldehyde condensates for use in practicing the invention include phenol itself or substituted phenols having the following general formula:

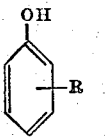

where R may be H, F, Cl, Br or a suitable substituent selected from the following:

(a) Alkyl groups of 1 to 18 carbon atoms in any of their isomeric forms and substituted on the phenolic nucleus in the ortho, meta or para positions;

(b) Alicyclic groups of 5 to 18 carbon atoms such as cyclohexyl, cyclopentyl, methyl cyclohexyl, butyl-cyclohexyl, etc.;

(c) Aromatic or aralkyl groups of 6 to 18 carbon atoms such as phenyl, alpha-methyl benzyl, benzyl, cumyl, etc.;

(d) Alkyl, alicyclic, aryl, and aralkyl ketones wherein the hydrocarbon is defined hereinbefore;

(e) Alkyl, alicyclic, aryl and aralkyl carboxylic groups wherein the hydrocarbon is defined hereinbefore, and mixtures thereof.

Suitable substituted phenols include the following: para-tertiary-butylphenol, para-secondary-butylphenol, para-tertiary-amylphenol, para-secondary-amylphenol, para-tertiary-hexylphenol, para-isooctyl-phenol, para-phenylphenol, para-benzylphenol, and para-cyclohexylphenol, para-decyl-phenol, para-dodecyl-phenol, para-tetra-decyl-phenol, para-octadecyl-phenol, para-nonyl-phenol, para-methyl-phenol, para-beta-naphthyl-phenol, para-alpha-naphthyl-phenol, para-pentadecyl-phenol, para-cetyl-phenol, para-cumyl-phenol, para-hydroxy acetophenone, para-hydroxy benzophenone, a phenol alkylated with limonene, a phenol alkylated with oleic acid, as well as the corresponding ortho and meta derivatives such as meta-butyl phenol and ortho-butyl phenol, as well as mixtures thereof.

From the foregoing, it is apparent that substantially any phenol can be used in practicing the present invention provided it has a reactive phenolic hydroxyl group and is capable of reacting with aldehydes such as formaldehyde to produce a condensate. The pure refined phenols may be used, but this is not always necessary. For instance, phenols may be alkylated and then reacted with an aldehyde as the crude product which may contain some polyalkylated as well as unalkylated phenols. Alternately the phenol-aldehyde resin is prepared and subsequently the phenolic nuclei are alkylated. Mixtures of phenols mentioned herein also can be used.

In producing the phenol-aldehyde condensates, any suitable aldehyde or mixtures of aldehydes capable of reacting with a phenol and having not more than, for example, eight carbon atoms is satisfactory, provided it does not contain a functional group or structure which is detrimental to the resinification reaction or with esterification or oxyalkylation of the resin. The preferred aldehyde is formaldehyde, which may be in aqueous solution or in any of its low polymeric forms such as paraform or trioxane. Other examples of aldehydes include acetaldehyde, propionaldehyde, butyraldehyde, benzaldehyde, furfural, 2-ethylhexanal, ethylbutyraldehyde, heptaldehyde, glyoxal, etc.

The amount of aldehyde to be condensed with the phenol can be varied to prepare novolaks of varying molecular weights and the melting point of the finished resin may be controlled by the mol weight of the novolak. Preferably, the amount of aldehyde varies from 0.5 to 1.0 mol per mol of the phenol when a mono or difunctional phenol is used. In instances where a trifunctional phenol is used, the preferred upper limit of aldehyde may be about 0.85 mol per mol of phenol so as to prevent formation of insoluble and infusible condensates.

In instances where a resin is prepared using the above-described ratios of aldehyde to phenol, it is preferred that the aldehyde and phenol be reacted using an alkaline catalyst such as ammonia, amines and quaternary ammonium bases.

It is also within the scope of the invention to prepare the phenol-aldehyde condensates using at least one mol of phenol per mol of aldehyde. The specific phenols and aldehydes which can be used are described above, and the alkaline catalysts described above also are useful. However, it is most common to use an acid catalyst such as sulfuric, hydrochloric, or oxalic acid.

In preparing the emulsion compositions of the invention, the preferred diluent for use with the phenol-aldehyde resin in the invention is water. However, other diluents that will dissolve the phenol-aldehyde resins can be used, such as mixtures of water with alcohol, such as isopropyl alcohol, butyl alcohol and amyl alcohol, or mixtures of water with acetone or other ketones, and the like. The ratio of the polyester resin to the phenol-aldehyde resin in the emulsion composition of the invention will vary depending on the nature of the desired product. However, this ratio will generally be within the range of about one part by weight of polyester per part of phenol-aldehyde resin to about twenty parts of polyester resin per part of phenol-aldehyde resin, and preferably in the range from five to fifteen parts of polyester resin per part of phenol-aldehyde resin. The ratio of phenol-aldehyde resin to diluent in the emulsion composition will generally be in the range of 0.2 to one part by weight of phenol-aldehyde resin per part of diluent, and preferably in the range of 0.3 to 0.8 part of phenol-aldehyde resin per part of diluent. The emulsion composition is prepared by mixing the liquid unsaturated polyester including the unsaturated monomer and catalyst, with the solution of phenol-aldehyde resin diluent. Emulsification is often carried out in the presence of an emulsifying agent, but such an agent is not required. Suitable emulsifying agents are compounds having a strong polar group attached to an aliphatic or aromatic residue. Typical examples are an alkyl aryl polyether alcohol, poly-oxy-ethylene sorbitan mono-laureate and sodium lauryl sulfonate.

The cellulosic material to be treated is contacted with the emulsion composition. The contacting step may be carried out in a variety of ways. For example, the cellulosic material can be immersed in a tank containing the emulsion composition for a suitable period of time in a batch-wise manner, or can be continuously passed through such a tank by means of rollers which facilitate the passage of a cellulosic sheet such as paper. The emulsion composition can also be applied to cellulosic material by spraying, or by passing a sheet of the material through rollers that have been wetted with the emulsion composition. The temperature of the process can be varied over wide limits, but is preferably at room temperature, or about 30° C. When the cellulosic material has been treated with the emulsion composition, the excess emulsion is drained or squeezed out, and the treated cellulosic material is dried at a temperature up to 150° C.

While not desiring to be limited by theory, it is my present belief that in the process of this invention, when the celluulosic material is contacted with the resin emulsion composition, the diluent present in the emulsion serves to penetrate and swell the cellulosic fibers. The surface of the cellulosic fibers is increased thereby permitting a more thorough and uniform deposition of the diluent-insoluble resin (polyester) on the surface of the fibers. The enlargement of the openings of the fibers permits admittance of the phenol-aldehyde resin, which remains as a residue within the fibers even after the diluent is evaporated in the drying and curing steps. Additives that are soluble in the diluent can be included in the formulation and then placed within the structure of the cellulose fiber as well as within the enveloping bonding resin by this mechanism. When the cellulosic material has been saturated with emulsion and then dried and cured, the fibers tend to return to their original condition, but the phenol-aldehyde resin and polyester resin remain well dispersed throughout the cellulosic material. In the curing step, the individual resins become cross-linked thereby causing stiffening of the resulting product.

Cellulosic materials treated in accordance with the method of this invention are well suited to the production of laminated structures. Such laminates can be readily prepared by compositing several layers of a treated cellulose sheet, together with layers of other materials such as a clear plastic such as polymethylmethacrylate, and a less expensive backing material such as wood. The composite is placed in a mold where pressures on the order of 50 to 2500 p.s.i. are applied to produce the desired laminated structure. Molding temperatures are generally in the range of 140 to 170° C. Other methods of lamination that are well known in the art can also be employed using the treated cellulosic material of the invention.

The following specific examples are intended to illustrate the invention but not to limit the scope thereof.

EXAMPLE 1

A resin emulsion composition was prepared as follows: Ten parts of dicumyl peroxide was mixed with 1,000 parts of an unsaturated polyester resin which is a polymerizable mixture of styrene and the reaction product of polycarboxylic acids and a polyhydric alcohol, and agitated with a propeller type mixer at 700–800 r.p.m. for ten minutes. Then a water-soluble, phenol-formaldehyde resin (100 parts) was blended with fifty parts of dry acetone and 100 parts water and mixed with a propeller type mixer for five minutes. Thereafter, the two solutions were mixed while agitation was continued with the propeller type mixer. An emulsion resulted.

Paper consisting of 0.014″ thick cotton linters alpha-cellulose was cut into 11″ x 11″ sheets weighing fifteen grams each. The sheets were immersed in a bath of the resin emulsion composition for five minutes, thereafter removed from the bath and passed through rolls and dried for twenty minutes at 100° C. in an air-circulating oven. Each treated sheet weighed about 37 grams. Five of the treated sheets were stacked in a press and molded at about 300 p.s.i. for twelve minutes at 270° F. The resulting laminate was tested and found to have the properties shown in Table 1.

EXAMPLE 2

This example shows the results of applying the phenol-aldehyde resin and the polyester resin to cellulosic material in two separate operations.

Sheets of the same type of paper used in Example 1 were immersed in a bath containing the phenol-formaldehyde resin prepared in Example 1 for five minutes, and thereafter removed from the bath and passed through squeeze rolls and dried in an oven for five minutes at 120° C. Then the resultant sheets were immersed in a bath containing the polyester resin utilized in Example 1, and the sheets were again removed from the bath, passed through rolls and dried for five minutes at 120° C. Five of the thus treated sheets were stacked in a press and molded at approximately 300 p.s.i. for twelve minutes at 270° F. The resulting laminate was tested and had the properties shown in Table I.

In the following Table I, the properties of the laminates produced in Examples 1 and 2 are shown and compared with a commercial grade phenolic laminate.

It will be noted that the properties of the laminates produced in accordance with the invention are vastly superior to those of a commercial phenolic laminate, and are equal to or better than those of the laminate produced in two steps in most respects. Of particular significance is the fact that the electrical properties of the laminate produced in accordance with the invention are superior to those of the laminate produced in two separate operations.

*Table I*

| Test | ASTM Test Method | Sample Condition | Example 1 | Example 2 | Commercial Phenolic Laminate NEMA Grade XXXPC |
|---|---|---|---|---|---|
| Flexural strength, p.s.i. | D-790 | A | 18,000 | 18,000 | 12,000 |
| Barcol hardness | D-570 | A | 50-55 | 50-55 | 35-45 |
| H₂O absorption, percent | D-150 | D-24/23 | 0.68 | 0.50 | 0.75 |
| Thickness, inches | | | 1/16 | 1/16 | 1/16 |
| Dielectric const. 1 MC | D-150 | D-24/23 | 4.03 | 4.60 | 4.80 |
| Dissipation fact. 1 MC | D-150 | D-24/23 | 0.029 | 0.040 | 0.035 |
| Insulation resistance, megohms | D-257 | C-96-35-90 | 240,000 | 100,000 | 20,000 |
| Paper content, percent | | | 47 | 40 | 40 |

EXAMPLE 3

One or more sheets of paper prepared in accordance with Example 1 were stacked on a piece of plywood in a press. The composite was molded at about 300 p.s.i. for about ten minutes at 280° F. The resulting plywood laminate was inspected and found to have an excellent smooth glossy surface through which the grain of the wood was readily apparent and had enhanced aesthetic qualities. The treated paper composition provides an excellent protective coating that provides increased resistance to moisture and dirt.

EXAMPLE 4

Following the procedure outlined in Example 1, a resin emulsion composition was prepared by blending for five minutes: 1000 parts of an unsaturated polyester resin which is a polymerizable mixture of styrene and the reaction product of polycarboxylic compounds including 1,4,5,6,7,7 - hexachlorobicyclo - (2.2.1) - 5 - heptene-2,3-dicarboxylic acid, and aliphatic glycols; and twenty parts of dicumyl peroxide. Then 100 parts of a water-soluble phenol-formaldehyde resin was blended for five minutes with fifty parts of water and 100 parts of methanol. Thereafter, the two solutions were blended for ten minutes and an emulsion resulted.

This resin emulsion composition was used to treat paper and prepare a laminate using the procedure of Example 1. The properties of the resulting laminate are shown in Table II.

EXAMPLE 5

Example 4 was repeated except that no phenol-formaldehyde solution was used; that is, the paper was only treated with the polyester. A laminate prepared from the resulting treated paper had the properties shown in Table II following:

Table II

| Test | ASTM Test Method | Example 5 | Example 4 |
|---|---|---|---|
| Paper content, percent | | 45.000 | 45.000 |
| Resin content, percent | | 55.000 | 55.000 |
| $H_2O$ absorption, percent | D-150 | 3.120 | 0.620 |
| Dielectric constant, 1 MC | D-150 | 5.010 | 4.150 |
| Dissipation factor, 1 MC | D-150 | 0.068 | 0.035 |
| Insulation resistance, megohms | D-257 | $2.8 \times 10^7$ | $2.4 \times 10^9$ |

It will be noted that the properties of the laminate prepared in accordance with the invention (Example 4) are vastly superior in all respects to the properties of the laminate containing only the polyester resin (Example 5).

The treated cellulosic materials of this invention can contain various ratios of polyester resin to phenol-formaldehyde resin, depending on the desired properties of the end products. However, this ratio will generally vary between about one to twenty parts of polyester resin per part of phenol-aldehyde resin, and preferably, between about five and fifteen parts of polyester resin per part of phenol-aldehyde resin. Likewise, the total resin content of the cellulosic material can vary widely, but will generally fall in the range of about 0.5 to 1.5 parts of resin per part of cellulose, and, preferably, from about 0.8 to 1.2 parts of resin per part of cellulose.

Various changes and modifications may be made in the method and compositions of this invention, certain preferred forms of which have been herein described, without departing from the spirit and scope of this invention. These modifications of this basic invention are to be regarded as within the scope and purview of this invention.

I claim:
1. An emulsion composition containing
   (1) a dispersed phase comprising a solution of a phenol-aldehyde resin in a diluent, and
   (2) a continuous phase comprising an unsaturated polyester resin comprising (a) a reaction product of a polycarboxylic compound and a polyhydric alcohol, and (b) a vinylidene monomer.
2. The composition of claim 1 wherein the phenol-aldehyde resin is a phenol-formaldehyde resin.
3. The composition of claim 1 wherein the polyester resin contains an adduct of hexahalocyclopentadiene wherein the halogen is selected from the group consisting of fluorine, chlorine and bromine.
4. The composition of claim 1 wherein the polyester resin comprises a reaction product of 1,4,5,6,7,7-hexachlorobicyclo-(2.2.1)-5-heptene-2,3-dicarboxylic acid, an unsaturated polycarboxylic compound and an aliphatic glycol.
5. An emulsion composition consisting essentially of:
   (1) a dispersed phase comprising an aqueous solution of a water-soluble phenol-aldehyde resin, and
   (2) a continuous phase comprising a polyester resin comprised of (a) a reaction product of an unsaturated polycarboxylic compound, a saturated polycarboxylic compound and a saturated polyhydric alcohol, and (b) a vinylidene monomer.
6. The process which comprises contacting a cellulosic material with an emulsion composition containing
   (1) a dispersed phase comprising a solution of a phenol-aldehyde resin in a diluent, and
   (2) a continuous phase comprising an unsaturated polyester resin comprising (a) a reaction product of a polycarboxylic compound and a polyhydric alcohol, and (b) a vinylidene monomer, and drying the resulting treated cellulosic material.
7. The process of claim 6 wherein the cellulosic material is paper.
8. The process of claim 7 wherein the paper is contacted by immersion in a bath of the emulsion composition.
9. The process of claim 8 wherein the dried, treated paper is cured at a temperature in the range of 140 to 170° C.
10. The process of claim 7 wherein the phenol-aldehyde resin is a phenol-formaldehyde resin.
11. The process of claim 7 wherein the polyester resin comprises the reaction product of 1,4,5,6,7,7-hexachlorobicyclo-(2.2.1)-5-heptene-2,3-dicarboxylic acid, an unsaturated polycarboxylic compound and an aliphatic glycol.
12. The process which comprises immersing paper in a bath of an emulsion composition consisting essentially of:
   (1) a dispersed phase comprising an aqueous solution of a water-soluble phenol-aldehyde resin, and
   (2) a continuous phase comprising a polyester resin comprised of (a) a reaction product of an unsaturated polycarboxylic compound, a saturated polycarboxylic compound, and a saturated polyhydric alcohol, and (b) a vinylidene monomer; and drying the resulting treated paper at a temperature up to 150 degrees centigrade.
13. A composition comprised of cellulosic fibers wherein the surface of said fibers is uniformly coated with a polyester resin comprising (a) a reaction product of a polycarboxylic compound and a polyhydric alcohol, and (b) a vinylidene monomer, and wherein said fibers contain a phenol-aldehyde resin.
14. A paper composition comprised of cellulosic fibers wherein the surface of said fibers is uniformly coated with a polyester resin comprised of (a) a reaction product of an unsaturated polycarboxylic compound, a saturated polycarboxylic compound and a saturated polyhydric alcohol and (b) a vinylidene monomer, and wherein said fibers contain a water-soluble phenol-aldehyde resin.
15. An article comprised of molded material of the composition of claim 13.
16. A laminated article comprised of molded sheets of the composition of claim 13.
17. A laminated article comprised of molded sheets of the paper composition of claim 14.
18. The paper composition of claim 14 wherein the phenol-aldehyde resin is a phenol-formaldehyde resin.
19. The paper composition of claim 14 wherein the polester resin comprises the reaction product of 1,4,5,6,7,7-hexachlorobicyclo-(2.2.1)-5-heptene-2,3-dicarboxylic acid, an unsaturated polycarboxylic compound and an aliphatic glycol.
20. A laminated article comprised of molded sheets of the composition of claim 19.
21. A laminated article comprised of at least one sheet of the paper composition of claim 14 molded in contact with a wooden surface.

References Cited by the Examiner

UNITED STATES PATENTS

| 2,022,004 | 11/35 | Larson | 260—29.2 XR |
| 2,629,701 | 2/53 | Ericke | 260—29.3 |
| 2,819,237 | 1/58 | Daniel | 260—29.3 XR |
| 2,898,256 | 8/59 | Robitschek et al. | 260—75 |
| 3,013,895 | 12/61 | Agruss | 117—155 XR |

FOREIGN PATENTS

| 1,022,379 | 1/58 | Germany. |

LEON J. BERCOVITZ, *Primary Examiner.*

DONALD E. CZAJA, *Examiner.*